(12) United States Patent
Wydra et al.

(10) Patent No.: US 6,598,067 B1
(45) Date of Patent: Jul. 22, 2003

(54) APPLICATION SERVER FRAMEWORK

(75) Inventors: Paul Wydra, Bristow, VA (US); Brendan Haggerty, Arlington, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/359,773

(22) Filed: Jul. 26, 1999

(51) Int. Cl.[7] .............................................. G06F 13/00
(52) U.S. Cl. ...................... 709/100; 709/102; 709/202; 709/203
(58) Field of Search ................................ 709/100, 101, 709/102, 103, 104, 203, 202

(56) References Cited

U.S. PATENT DOCUMENTS

| 5,414,845 | A | * | 5/1995 | Behm et al. | 709/104 |
| 5,455,948 | A | * | 10/1995 | Poole et al. | 707/102 |
| 5,812,780 | A | * | 9/1998 | Chen et al. | 709/224 |
| 5,889,944 | A | * | 3/1999 | Butt et al. | 709/203 |
| 5,893,106 | A | | 4/1999 | Brobst et al. | 707/102 |
| 5,953,229 | A | * | 9/1999 | Clark et al. | 700/100 |
| 6,222,530 | B1 | * | 4/2001 | Sequeira | 707/500.1 |

OTHER PUBLICATIONS

About IBM WebSphere Application Server (2 pages—www.patents.ibm.com).

* cited by examiner

Primary Examiner—Kenneth R. Coulter
(74) Attorney, Agent, or Firm—Staas & Halsey LLP

(57) ABSTRACT

An application server framework is integrated with a three-tiered computer system including an application server. The application server framework includes a job scheduler, a connection controller, a listener, and a service broker. The jobs scheduler is integrated with the application server and independently requesting execution of services. The connection controller establishes connections with services based upon the requested execution of services. The listener receives requests for execution of services and transmitting the requested execution of services to the connection controller. The service broker transmits the requests for execution of services to the listener.

7 Claims, 12 Drawing Sheets

FIG. 11

Schedule for Electronic Document Access

Time
- ⊙ Once at [09:00]
- ○ Every [6 ▾] minutes, starting at [09:00] and ending at [20:00]

Date
- ○ Never
- ⊙ Daily    Every [1 ▾] day(s).   ☐ Except Weekends
- ○ Weekly
- ○ Monthly

[Cancel]
[OK]

:EDATestServer - Log Viewer

| Date | Type | User | Application/Message |
|---|---|---|---|
| 07/27/1998 09:00:55.8 | INF | super | EDATestServer - Scheduler Job 'Electronic Document Access' scheduled to run at 7/28/98 09:00:00. |
| 07/27/1998 09:00:55.3 | INF | super | EDATestServer - Scheduler Job 'Electronic Document Access' completed |
| 07/27/1998 09:00:54.7 | INF | super | EDATestServer - Scheduler Job 'Electronic Document Access' started. |
| 07/27/1998 08:59:55.6 | INF | super | EDATestServer - Scheduler Job 'Electronic Document Access' scheduled to run at 7/27/98 09:00:00. |
| 07/27/1998 08:59:55.2 | INF | super | EDATestServer - Scheduler Job 'Electronic Document Access' completed |
| 07/27/1998 08:59:54.7 | INF | super | EDATestServer - Scheduler Job 'Electronic Document Access' scheduled to run at 7/27/98 09:00:00. |
| 07/27/1998 08:58:55.3 | INF | super | EDATestServer - Scheduler Job 'Electronic Document Access' completed |

160

APPLICATION SERVER FRAMEWORK

BACKGROUND OF THE INVENTION

1. Field of the Invention

The present invention is directed to computer systems including application servers generally, and, more particularly, to providing a computer software framework on an application server accommodating transparent porting of application software from a client computer to the application server and transparent execution by the application server rather than by the client computer of the application software.

2. Description of the Related Art

Computer systems having distributed architectures are known in the art. More particularly, client-server architectures are known in the art. In such computer systems, processing occurs either on the clients or on the server, typically referred to as a data base server. With processing occurring on either the clients or the server, the processing speed of whichever of the clients or the server executing the processing is hampered and therefore degrades. The degradation of processing speed makes the potential for adding additional processing intensive modules or functionality infeasible for some applications, such as the Standard Desktop Procurement System (SPS), thereby preventing full utilization of the particular application, such as the SPS. For example, the foregoing limitations of the related art do not allow some users, such as the U.S. Government, to realize the full capabilities of the SPS. More particularly, a U.S. Department of Defense (DoD) desktop procurement system needs to maintain a balance between a robust system to accommodate 80% of the procurement users and provide processing efficiencies for intensive processing, which needs are not fulfilled by computer systems of the related art.

An application server is a computer software application that runs in a client-server environment, but that is distinct from both the client and server applications. Typically, this application performs business rule or other processing that is computationally intensive at the request of the client.

Application servers, generally, are well known in the art. An example of an application server is IBM WebSphere Application Server™, disclosed in About IBM WebSphere Application Server™. Another example of an application server is disclosed in U.S. Pat. No. 5,893,106 to Brobst, et al., entitled Object Oriented Server Process Framework with Interdependent-Object Creation.

Computer systems having application servers provided logically between a data base server and clients are referred to as three tiered architectures, which are known in the art. FIG. 1 shows an example of a computer system 10 of the related art having a three-tiered architecture and including an application server 12. As shown in the computer system 10 of FIG. 1, the application server 12 is separate and distinct from clients 14-1 through 14-n and from data base server 16, but is provided logically between the clients 14 and the data base server 16. The application server 12 alleviates processing load from the data base server 16, and, further, provides additional functions such as load balancing and process scheduling within the computer system 10.

As shown in the computer system 10 of FIG. 1, one of the clients 14 transmits a request to the application server 12, which, in turn, reformats the request and transmits it in the form of an OB (outbound) request to the data base server 16. The data base server 16 returns data to the application server 12, which reformats the data into an answer transmitted to the requesting client 14.

Commercially-available software programs, such as native PowerBuilder™ facilities, extend the function of the application server 12. Through the use of native PowerBuilder™ facilities, application software written to be executed by the clients 14 (hereafter also referred to as client code) can be migrated to the application server 12 for execution thereby. Thus, instead of an architecture in which client computers 14 interface directly to data base server 16, as in a traditional client-server environment, client computers 14 interface to application server 12, which in turn interfaces to data base server 16 (as shown in FIG. 1).

A problem, though, with the use of native PowerBuilder™ facilities is that the client code must be rewritten before the client code can be successfully ported from the client computers 14 to the application server 12.

Although native PowerBuilder™ facilities insulate the client code from the architecture of the computer system to some degree, these facilities fail to make the architecture completely transparent to the client. The primary issue that prevents complete client transparency is that the client still must explicitly connect to an application server and ask the server to create a remote object. In addition, if a site wishes to install more than one application server in order to spread demand across multiple machines, the client would then need to be able to pick the appropriate application server. Thus, the client code must be rewritten before it can be successfully ported to and executed by the application servers of the related art.

Neither porting of client code from the clients to the application server nor execution of the client code by the application server rather than the client is transparent in the computer systems of the related art.

Also known in the art is a job scheduler, which stores a list of jobs with associated schedules, and ensures that the jobs are run according to that schedule.

Throughout the following paragraphs, terms such as job, process, and service are used interchangeably.

SUMMARY OF THE INVENTION

It is therefore an object of the present invention to provide an application server framework which overcomes the above-mentioned problems of the related art.

It is another object of the present invention to provide an interface to manage the Standard Desktop Procurement System (SPS) servers.

A further object of the present invention is to allow installation of the SPS client software to be independent of whether an application server is running.

Yet another object of the present invention is to accommodate job management initiated from a client.

Still another object of the present invention is to provide connection security, remote object creation, scheduling and batch processing, and remote server management functions.

A still further object of the present invention is to alleviate processing load from the clients and from the data base server.

Yet a further object of the present invention is to allow an application server to be installed and operational without altering client code.

A yet additional object of the present invention is to allow additional application software modules to be installed without degrading the performance of either the clients or the data base server.

A further object of the present invention is to provide a desktop procurement system maintaining a balance between a robust system to accommodate 80% of the procurement users and providing processing efficiencies for intensive processing.

The Application Server Framework (ASF) of the present invention provides SPS the efficiencies that the computer systems of the related art would not allow.

The Application Server Framework (ASF) eliminates the problems discussed above and also provides an interface to manage the SPS application servers by taking advantage of PowerBuilder™ 6.0 functionality and tailoring it to the Department of Defense's (DoD) needs. The ASF of the present invention allows installation of the SPS client software independently of whether an application server is running. Further, with the ASF of the present invention, a site can install the latest version of the SPS software without choosing to install an application server and then add the application server executing the ASF later, without making changes to the client code. In addition, the plug in capability of the ASF allows additional modules to be added to the Standard Procurement System (SPS) without degrading the performance of the client computers or the database server of the computer system in which the ASF is installed.

The ASF of the present invention accommodates job management initiated from the client computers. Using the job management option, authorized users create batch, on-demand or scheduled services. These services will be performed on any module that is "plugged into" the ASF of the present invention.

The ASF of the present invention is a software system which, when installed on an application server, provides the above-mentioned features and functions to the computer system in which the application server is provided. The ASF of the present invention insulates client code in the form of, for example, computer modules implementing business processes, from communication with a data base server so that the client code can be ported from the client computer to the application server and execute without being altered. Accordingly, through the ASF of the present invention, the client code formerly isolated to being executed by the client computer on which it was installed is made available to all of the client computers interfacing to the application server to which the client code is ported.

With the ASF of the present invention, the computer system includes an application server and a job scheduler integrated with the application server that independently requests execution of services.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 11 shows a jobs list screen of the jobs scheduled to be executed by the application server; and FIG. 12 shows a log viewer screen of the ASF of the present invention.

DESCRIPTION OF THE PREFERRED EMBODIMENTS

The Application Server Framework (ASF) of the present invention includes the following high level responsibilities:

A. Connection security—When a client attempts to connect to an application server, the ASF controls the server to verify the client's username and password and either grants or disallows the connection request. Users that are allowed to connect are provided with either normal user privileges or administrative privileges, based on the log-in name and other information.

B. Remote object creation—When a client requests a remote object (via the client-side component of the ASF), the ASF responds by creating the object and returning an object handle to the client.

C. Scheduling and batch processing—In addition to providing a three-tier application framework, the ASF provides the ability to create and schedule batch services. These services do not respond to client requests, but run on a scheduled basis under the control of the ASF itself.

D. Remote server management—Users with administrative privileges are able to view a list of users who are connected to an application server as well as detailed information about each client and disconnect users from the application server. Administrative users are also able to remotely stop the application server.

The Application Server Framework (ASF) of the present invention, which is written in PowerBuilder™, accommodates on-demand and batch processing, is capable of scheduling and queuing, and can perform load balancing functions. A site can install this application server at the time of installation of the client software or at a later time without having to make changes to the client software. An application server is installed, in a separate installation, directly to the machine (typically a server) where it is desired to reside. A site can install more than one application server on a single machine. The application servers may be established to provide the same or different services. Since the ASF of the present invention provides job scheduling across a single or multiple application servers, allowing multiple application servers to work together, the ASF differs from a typical three tiered architecture application or a distributed architecture.

Figure 1:
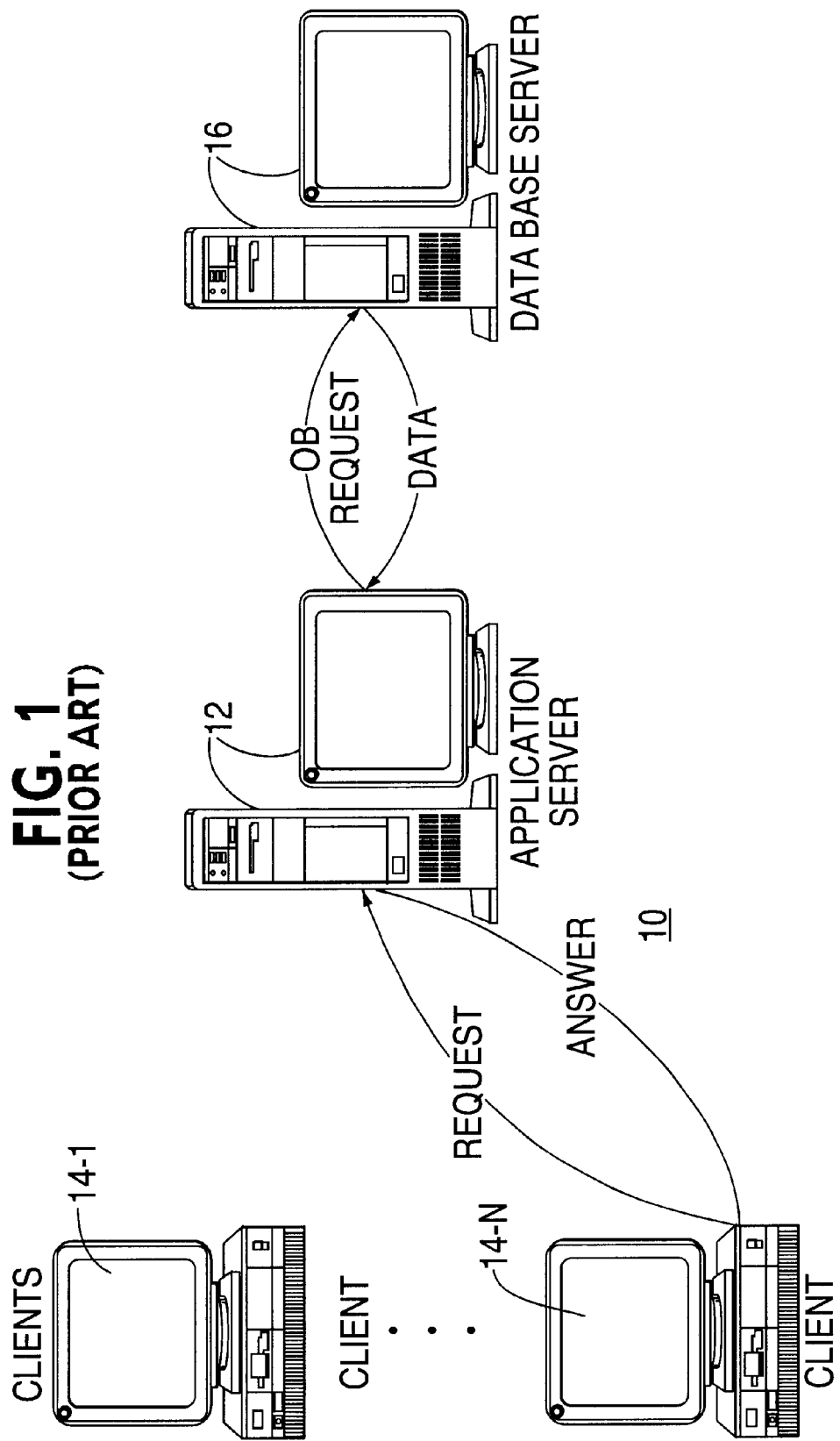
FIG. 1 shows a three tiered architecture, including an application server, of the related art.
Figure 2:
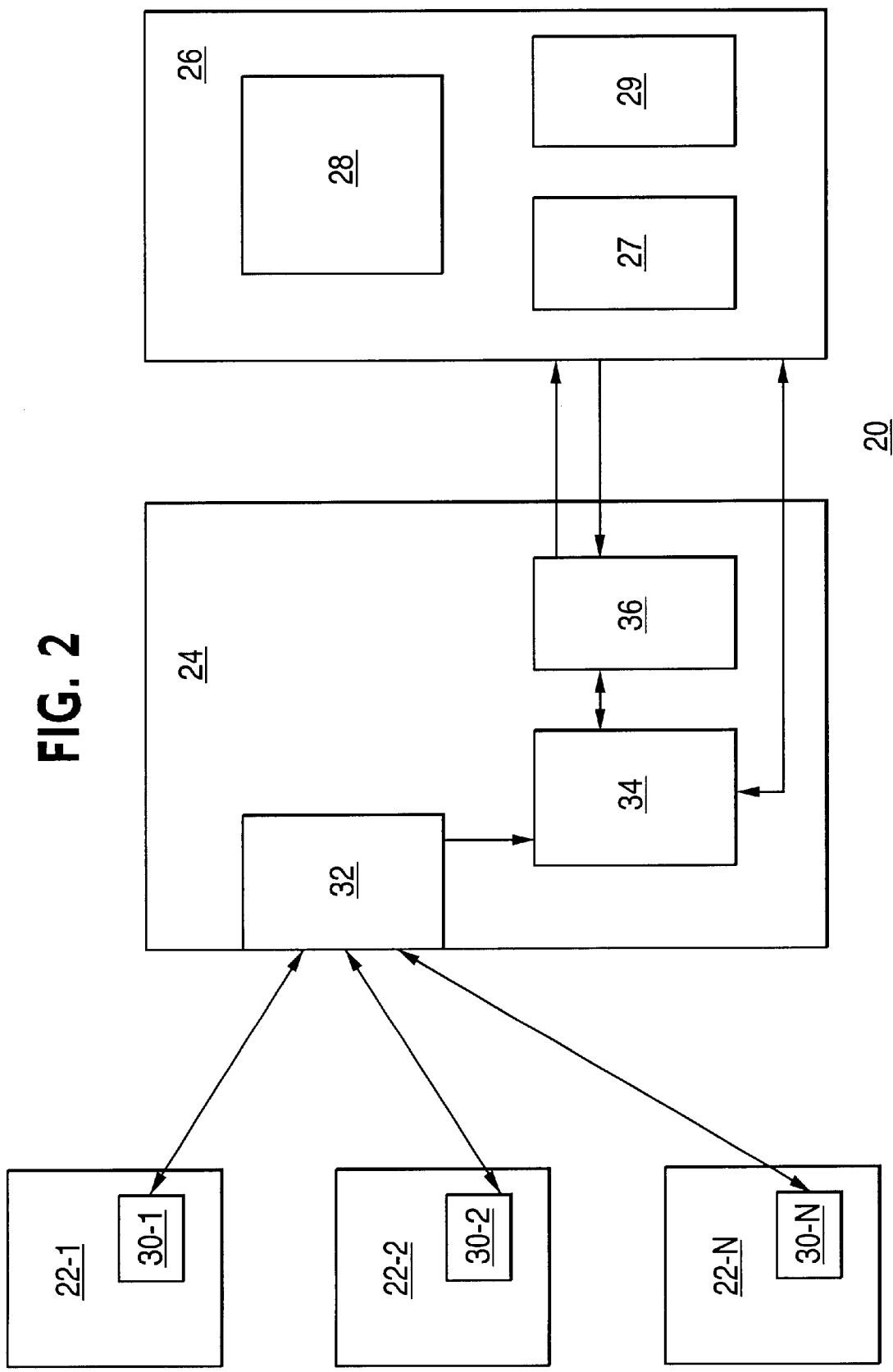
FIG. 2 shows an overview of a computer system 20 including the Application Server Framework (ASF) of the present invention.

FIG. 2 shows an overview of a computer system 20 including the Application Server Framework (ASF) of the present invention. As shown in FIG. 2, the computer system 20 includes client computers 22-1 through 22-N, interfacing to an application server 24, which, in turn, interfaces to a data base server 26. Included within data base server 26 is a data base 28, such as a Sybase™ data base.

Also included in computer system 20 is the ASF of the present invention. The ASF of the present invention includes several software modules residing on and executed by an application server, a software module residing on and executed by each client computer coupled to the application server, and 2 files stored on the data base server 26. More particularly, the ASF of the present invention includes service brokers 301 through 30-N, provided on and executed by the client computers 22-1 through 22-N, respectively. The ASF of the present invention also includes a listener 32, a connection controller (which is also referred to as a connection manager) 34, and a schedule controller (or job scheduler) 36, each provided on and executed by the application server 24. In addition, the ASF of the present invention includes, stored on data base server 26, a schedule 27 of services to be executed and a list 29 of application servers and the jobs that are executable thereon. The ASF also includes a conventional load balancer (not shown in FIG. 2, but shown and discussed with reference to FIG. 9) running on the application server 24.

Preferably, each of the service broker 30, the listener 32, the connection controller 34, the schedule controller 36, and the load balancer are software modules written in a conventional computer language, such as PowerBuilder™.

For the purposes of explanation, only one application server 24 is shown in the computer system 20 of FIG. 2. However, with the ASF of the present invention, multiple application servers 24, each executing the ASF of the present invention, may be provided in the same computer system 20, with the client computers 22 interfacing to each or multiple application servers 24. The ASF of the present invention then determines between the multiple application servers which will execute the service requested by the client. Alternatively, more than one application server 24 may be installed on a single machine. The application servers 24 may be established to provide the same or different services.

In addition to services provided by the ASF of the present invention, the client computers 22, the application server 24, and the data base server 26 provide services typically provided by conventional client computers, application servers, and data base servers, respectively. The ASF of the present invention can be installed directly to the application server 24 without impacting the client computers 22 or the database server 26.

A brief explanation of functions provided by the service brokers 30, the listener 32, the connection controller 34, and the schedule controller 36 of the ASF of the present invention is now provided.

In the computer system 20 of the present invention, the client computers 22 request a service to be performed. The service broker 30 section of the ASF determines whether the application server 24 to which the client computer 22 is coupled can execute the requested service. If so, then the service broker 30 interfaces with the listener 32 section of the ASF residing on the application server 24, and transmits the service request to the listener 32. Accordingly, through the use of the service broker 30, the client computer 22 is otherwise relieved of the burden of having to be aware of which application server 24 (particularly, if there are several application servers 24 included in the computer system 20, as explained herein below) is executing the requested service.

The listener 32 then interfaces to the connection controller 34 section of the ASF, which either creates the service or process requested, then executes the service or process, or, if the requested service or process had been created previously, establishes a connection to the service or process. The requested service may require the application server 24 to interface with the data base server 26 or with other application servers (not shown in FIG. 2). The connection controller 34 also interfaces to the schedule controller 36 section of the ASF, which establishes and maintains a schedule for the execution of each requested service, and notifies the client computer 22 requesting the service upon completion of the service. Through the use of the schedule controller 36, the client computer 22 may request that a service be executed at some future time, and the client computer need not be logged onto the computer system 20 at the requested service execution time for the service to be successfully executed.

If the application server 24 to which the client computer 22 making the request for service cannot execute the requested service, then the service broker 30 section of the ASF determines whether the client computer 22 making the request can also execute the service (i.e., whether the client code required to successfully fulfill the service request resides on the client computer making the service request). If so, then the service broker 30 interfaces with the client code residing on the client computer 22 to fulfill the service request A more detailed explanation of the functionality of, and the interfacing between, the service broker 30, the listener 32, the connection controller 34, and the schedule controller 36 of the ASF of the present invention is provided herein below, after an explanation of service execution by the ASF of the present invention.

Figure 3:
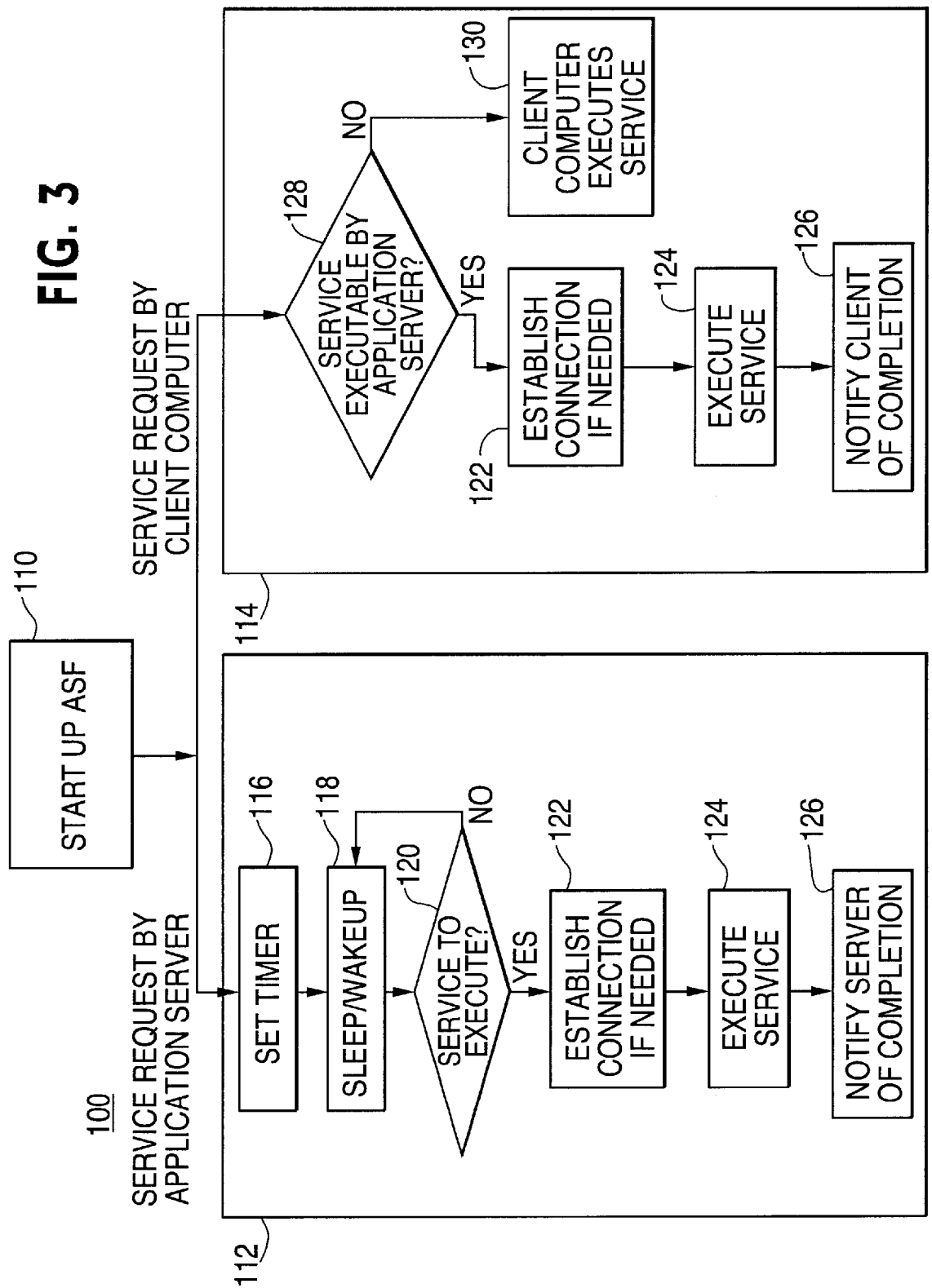
FIG. 3 is a flowchart showing an overview of the functions provided by the ASF of the present invention.

Using the ASF of the present invention, services may be requested by either the application server 24 or the clients 22. FIG. 3 is a flowchart 100 showing an overview of the functions provided by the ASF of the present invention, including ASF startup in operation 110, flow 112 (executed when a service request is made by an application server 24) and flow 114 (executed when a service request is made by a client computer for immediate execution).

As shown in FIG. 3, in operation 110, the ASF of the present invention is started up. Startup of the ASF of the present invention includes building a schedule of services to be executed using the schedule controller 36, establishing connections using the connection controller 34, and generally ensuring that the data base 28 is accessible by the ASF of the present invention. Operation 110 is typically executed once, upon system startup, whereas flow 112 and flow 114 are each typically executed whenever a service is requested by the application server (for flow 112) or by the client computer (for flow 114).

Referring again to FIG. 3, next, in flow 112, in operation 116, for service requests made by the application server 24 a timer is set, preferably in one-minute intervals. The ASF then sleeps and wakes up in 118 upon prompting by the timer at each one-minute interval. The ASF, in operation 120, then determines whether an unexecuted process has been requested for execution at or before the current time. If not, then control returns to operation 118 and the ASF continues to sleep/wakeup during the one-minute time intervals.

If a process has been requested for execution, then in operation 122, the ASF of the present invention establishes a connection to the process, if needed. A connection would not need to be established if such a connection had been established previously. After the connection is established, the requested service is executed in operation 124, and the application server 24 making the request is notified of completion of the process in operation 126.

The foregoing operations 116 through 124 are typically followed when a process is requested, either by a client computer 22 or an application server 24, to be executed at a future time. Even though the process may be requested by a client computer 22, since the process is requested for execution at a future time, the request appears as though it is being initiated by the application server 24.

Alternatively, if a service request is made by a client computer 22, for example for immediate execution, the ASF of the present invention executes flow 114. In flow 114, the service broker 30 determines whether the requested service is executable by the application server 24, in operation 128. If so, then operations 122, 124, and 126 are executed as in flow 112, as explained herein above, with one exception: in operation 126, the client computer 22 (not the application server 24) making the service request is notified of the completion of the requested service.

If the service request made by the client computer 22 is not executable by the application server 24, then the client computer 22 making the request for the process executes in operation 130 the requested service.

Each of operation 110, flow 112, and flow 114 of the ASF of the present invention are explained in further detail with reference to software architectures of the ASF shown in FIGS. 4–6.

Figure 4:
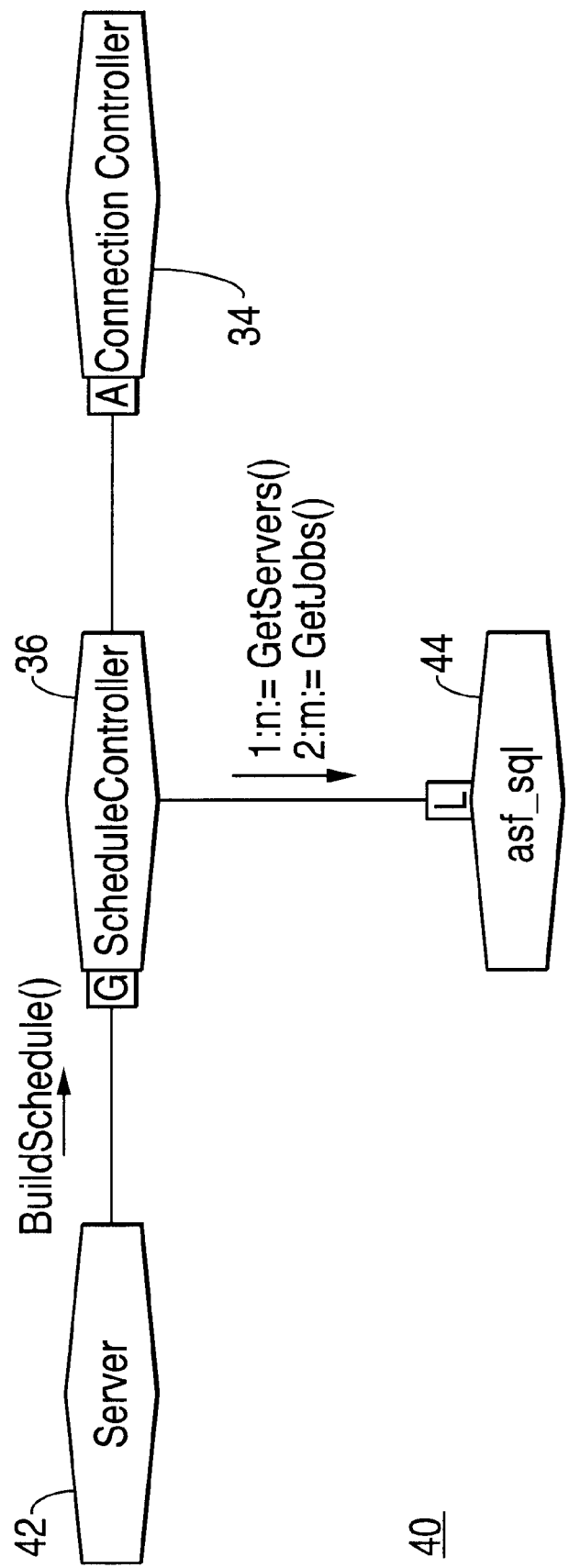
FIG. 4 is a diagram of the software architecture of the ASF startup function.

The software architecture 40 of the ASF shown in FIG. 4 corresponds to function of the ASF shown in operation 110 of FIG. 3. In the software architecture 40 shown in FIG. 4, the start up ASF functions of operation 110 shown are provided in the ASF on the application server 24. Referring now to FIG. 4, a server function 42 initiates building of a schedule of services to be executed, principally by the application server 24, and, accordingly, the establishment of the schedule controller 36 in communication with the connection controller 34. Also as part of the start up ASF operation 110, the schedule controller 36 initiates processes such as establishing communication with servers and with jobs, using asf_sql module 44.

Once the ASF of the present invention has been started, in accordance with FIG. 4, then the process of the ASF shown in operation 112 is executed for a service request initiated by the application server 24. FIG. 5 shows the software architecture 45 of the ASF of the present invention implementing operation 112 of FIG. 3. The functions of the ASF disclosed in FIG. 5 are executed on the application server 24.

Figure 5:
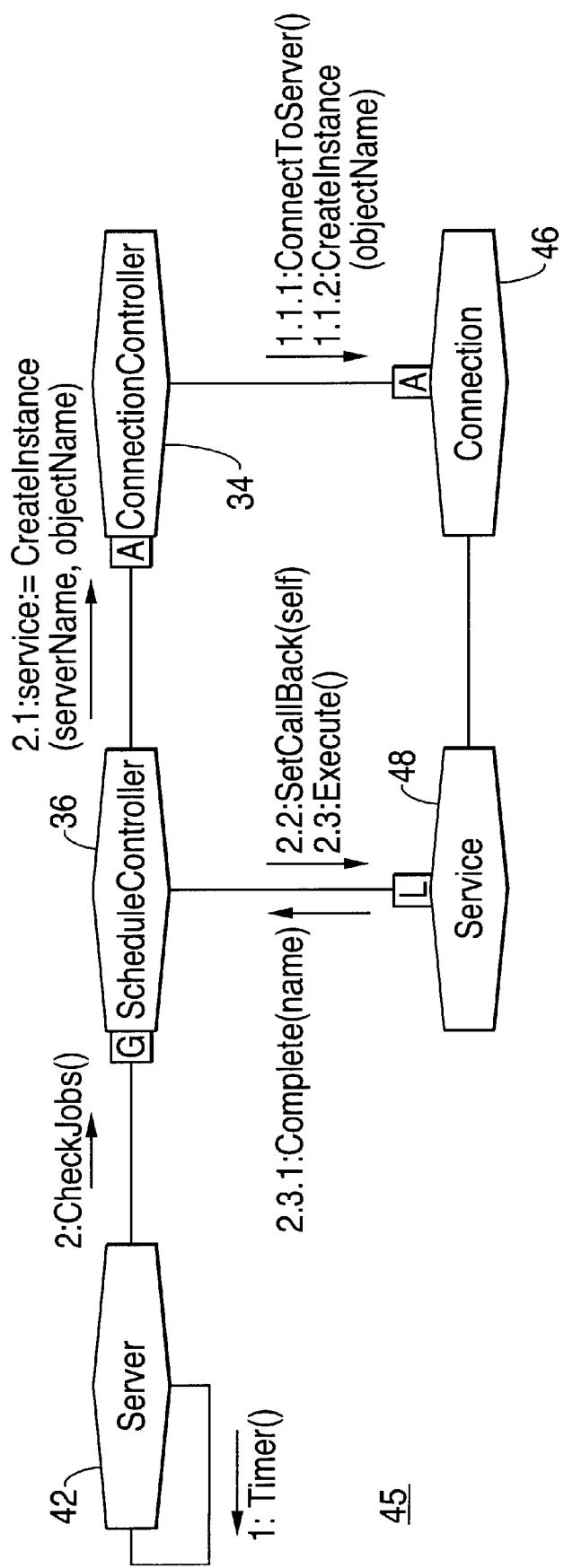
FIG. 5 is a diagram of the software architecture of the flow of the ASF for a service requested by an application server.

As shown in FIG. 5, the server function 42, in response to a timer, initiates a function of the schedule controller 36 to check jobs (or services) to be executed. If a service is scheduled to be executed at this time, then the schedule controller instructs the connection controller 34 to create an instance of the process, and provides to the connection controller the name of the application server 24 making the request for the process (the handle), along with the object name of the process. The connection controller 34 then establishes a connection 46 (for example, to the data base server 26). Establishment of a connection 46 includes providing to the connection 46 process an instruction to connection to the server 26, along with instruction to create an instance of the process of the object name to execute the service 48.

Also as shown in FIG. 5, the schedule controller 36 provides to the service 48 being executed a handle to call back to the schedule controller 36 creating the instance, and instructions to execute the service 48. The service 48 then notifies the schedule controller 36 of the completion, by name, of the service 48.

Figure 6:
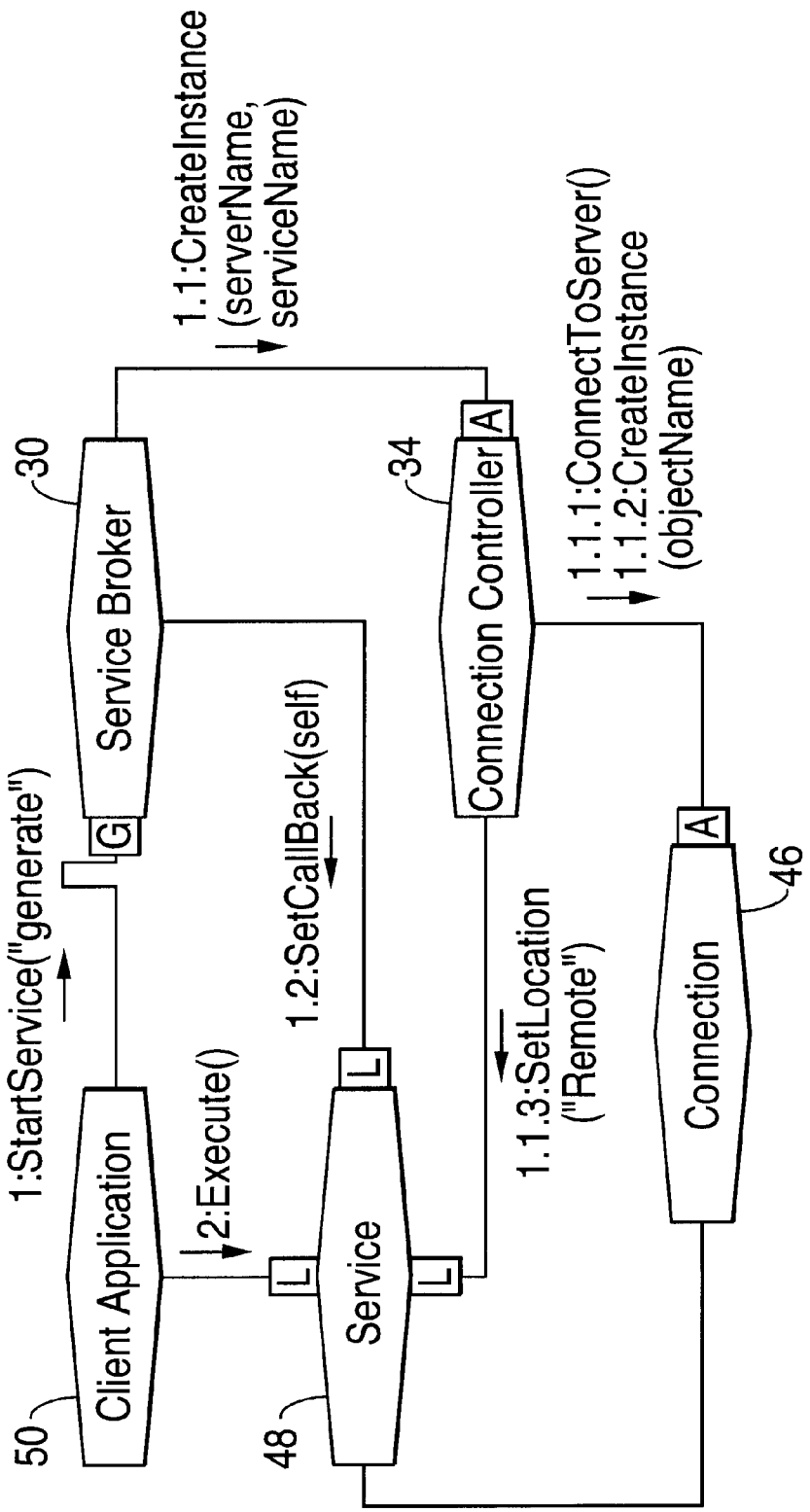
FIG. 6 is a diagram of the software architecture of the flow of the ASF for a service requested by a client computer.

FIG. 6 shows the software architecture 49 of the ASF of the present invention implementing operation 114 of FIG. 3. The functions of the ASF disclosed in FIG. 6 are executed on the application server 24 and on client computer 22. As shown in FIG. 6, a client application 50 running on a client computer 22 requests of the service broker 30 of the client computer 22 to generate a service to be provided to the client application 50. The service broker 30 of the client computer 22 then creates an instance of the service, by providing to the connection controller 34 of the application server 24 the server name of the server to execute the service, along with the service name of the service to be provided. The connection controller 34 then connects to the server having the server name provided by the service broker, and creates an instance of the service to be provided, identified by the object name. Accordingly, a connection 46 is established to the service 48 requested.

Also as shown in FIG. 6, the connection controller 34 sets the location (which is remote) of the service 48 to be provided to the client application 50. After the service 48 is established, the service 48 receives from the service broker 30 requesting the service 48 a callback instruction to notify the service broker 30 upon completion of the service 48. The service is executed, as shown in FIG. 6, in accordance with instructions and parameters provided to the service by the client application 50.

Figure 7:
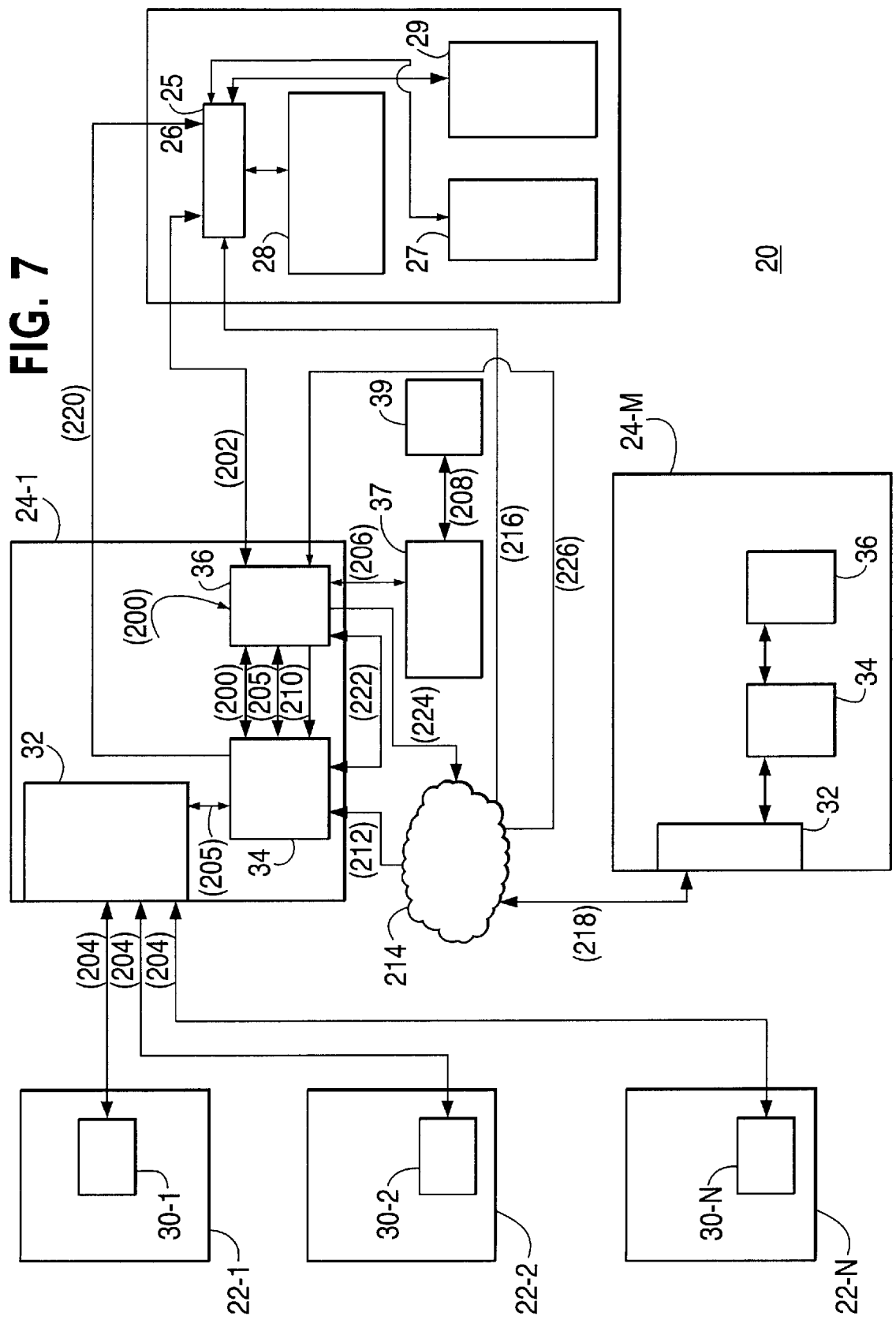
FIG. 7 is a detailed architecture diagram of a computer system including the ASF of the present invention.

FIG. 7 is a detailed architecture diagram of the computer system 20 including the ASF of the present invention, shown in FIG. 2. The computer system 20 is executing, for example, the U. S. Department of Defense (DoD) Standard Desktop Procurement System (SPS).

Referring now to FIG. 7, the operations executed or directed by the ASF of the present invention are now explained. In the computer system 20 of FIG. 7, multiple client computers 22-1 through 22-N are shown, as are multiple application servers 24-1 through 24-M. Client computers 22-1 through 22-N each include the service broker component of the ASF, shown as service brokers 30-1 through 30-N, respectively. Additionally, each application server 24-1 through 24-M includes a listener 32, a connection controller 34, and a schedule controller 36 of the ASF of the present invention. Further, each client computer 22-1 through 22-N is logically coupled to each application server 24-1 through 24-M, either through the listener 32 of a primary application server 24-1 (which listener 32 of 24-1 is then coupled to each listener 32 of each remaining application server 24-2 through 24-M) or directly to the listener 32 of each application server 24-1 through 24-M. Each application server 24-1 through 24-M is also logically coupled to data base server 26.

Referring again to FIG. 7, communication between the client computers 22 and the application servers 24 occurs between the respective service brokers 30 of the client computers and the respective listeners 32 of the application servers. Likewise, communication among the application servers 24 occurs through respective listeners 32. Communication between the application servers 24 and the data base server 26 occurs through both the respective connection controllers 34 and the respective schedule controllers 36.

When the ASF is installed on more than one application server 24 within a computer system 20, one of the application servers 24-1 (for example) is designated as the primary application 24. The primary application server 24-1 communicates with the client computers 22-1 through 22-N, and with the other application servers 24-2 through 24-M included in the computer system 20. Further, the primary application server 24-1 determines which of the application servers 24-1 through 24-M will perform a requested service.

The operations and the functions of the ASF of the present invention are now described in further detail with reference to FIG. 7. It will be appreciated by those of ordinary skill in the art that, in addition to the ASF functions of the present invention disclosed herein, the client computers 22, the application servers 24, and the data base server 26 also provide conventional functions associated therewith.

The ASF of the present invention is installed (200) on each of the application servers 24-1 through 24-M of FIG. 7, using the operation disclosed herein above with reference to FIG. 4. The ASF installation operation, as disclosed with reference to FIG. 4, creates (200) on each of the application servers 24 a schedule controller 36 and a connection controller 34. At startup of the ASF of the present invention, the schedule controller 36 reads (202) the schedule of services to be provided 27 from the data base server 26, through a relational data base management system 25 (RDMS). If there are services to be executed by the application server 24-1 reading the schedule 27, then the services are provided in accordance with the flow 112 shown in FIG. 3, using the software architecture 45 of the ASF shown in FIG. 5.

Additionally, the primary application server 24-1 monitors through listener 32 each of the client computers 22-1 through 22-N for requests for service. Preferably, the listener 32 of the primary application server 24-1 is coupled to each of the client computers 22 and to the other application servers 24 through a TCP/IP connection. Requests for service received from client computers 22 are executed in accordance with flow 114 shown in FIG. 3, using the software architecture 49 of the ASF shown in FIG. 6.

Upon receipt (204) of a request for service, such as a refresh, from the service brokers 30-1 through 30-N, the listener 32 transmits (205) the request for service to the schedule controller 36, which also reads (202) the schedule 27 of services to be performed.

Therefore, the schedule 27 is read (202) by the schedule controller during either of 2 events: startup or refresh.

Further, the schedule controller 36 receives (206) from the operating system 37, such as WINDOWS, a message of time each minute, based upon the monitoring (208) by the operating system 37 of the system clock 39.

If the schedule controller 36 determines that there are no services requested in the schedule to be performed at the current time, then the schedule controller 36 awaits notification (206) by the operating system 37 of the passage of another minute, and, upon receipt thereof, the schedule controller 36 again determines whether there are services to be provided during the subsequent minute.

On the other hand, if there are services scheduled to be provided during at the current time, based upon the schedule 27, the schedule controller 36 notifies (210) the connection controller 34 of such. The connection controller 34 then creates (212), if needed, the service 214 to be provided. The service 214 most likely involves interaction (216) with the data base 28, through the RDMS 25. However, the service 214 may also involve a process wholly contained within the primary application server 24-1, or interaction (218) with another application server 24-M, through the listener 32 of the application server 24-M.

If the requested service includes a task to be performed by another application server(s) 24-2 through 24-M, the connection controller 34 of the primary application server 24-1 determines which of the application servers 24-2 through 24-M will perform the task by reading (220) through the RDMS 25 the list 29 of application servers 24-1 through 24-M, and the jobs each of the application servers 24-1 through 24-M is capable of executing. The application server 24-M (for example) selected for executing the requested service would do so consistent with the description of the execution of a service provided herein with respect to application server 24-1.

Each service, when created, includes a connection and a handle (pointer to or address of the service). When the connection controller 34 has created the service to be executed, the connection controller 34 maintains and transmits (222) to the schedule controller the handle.

The schedule controller 36 then instructs (224) the service 214 to execute asynchronously, in a fire-and-forget mode. At the completion of the service 214, the schedule controller 36 is notified (226) of such. The objects created and used during in the service 214 are destroyed, but the shell of the connection is maintained, for possible future re-execution, eliminating the need to repeatedly create the same service if requested again at a later time.

The service broker 30 of the ASF of the present invention resides on the client computer 22, alleviating the client computer 22 of having to be aware of where the requested service is running, interfaces with the application server 24 through the listener 32 of the ASF to get the requested service performed, and provides the handle of the service being performed to the client computer 22. If the application server 24 cannot perform the requested service, and if none of the application servers 24 in the computer system 20 can perform the requested service, the service broker 30 creates the service on the client computer 22 and still provides the handle of the service being executed to the client computer 22.

Examples of services provided in an application server 24 include electronic document access (EDA), electronic document interfacing (EDI), solicitation services, etc. EDA and EDI are known. Solicitation services are also known and include statements by the U.S. Government of what the U.S. Government wants to buy, and which are sent to industry. The statements, or solicitations, are marked as ready for release to the public at a future date/time, and cannot be released before that date/time. Conventionally, a solicitation is released by the client computer at the designated date/time, but the client computer must be booted up and running to release the solicitation.

On the other hand, by using the ASF of the present invention, the solicitation services could be moved from a client computer 22 to an application server 24 executing the ASF so that a user working at a client computer 22 could mark a solicitation for release at a future date/time, which would make a request to the application server 24 executing the ASF of the present invention to execute the solicitation service at the designated date/time. Execution of the requested solicitation service would then be the responsibility of the application server 24 running the ASF, and the client computer 22 could then be turned off. The application server 24 executing the ASF of the present invention would then add the requested service to the schedule of services 27, by setting flags in the data base 26 (which flags indicate that the requested service should be added to the schedule of services 27). The flags include a flag indicating that a solicitation is ready for release at a particular date/time, that an EDI should be transmitted in 10 minutes, etc. When the appointed hour arrives, the ASF, using the schedule controller 36, would execute the requested service, as explained herein above.

In accordance with the above-mentioned processes, client code, or components thereof, can be ported to and executed by application servers 24-1 through 24-M. To be ported to application servers in the ASF of the present invention, client code must fulfill the following requirements:

A. the ported objects must be non-visual objects only;

B. the component of the client code residing on the client computers 22 must be addressable by the application servers 24; and C. the component of the client code being ported must be extricable from the client code, and, more particularly, the component must be inherited from an existing model of a business process and must be able to be integrated seamlessly into the application server 24.

For example, in an object-oriented system, the services object may itself point to services such as an EDA service, an EDI service, a solicitation service, etc., each of which is itself an object. The service to be executed by the application server 24 must itself be an object inherited from the services object so that the application server 24 can communicate with the service to be executed through the same interface as used for all of the services related to the services object.

Figure 8:
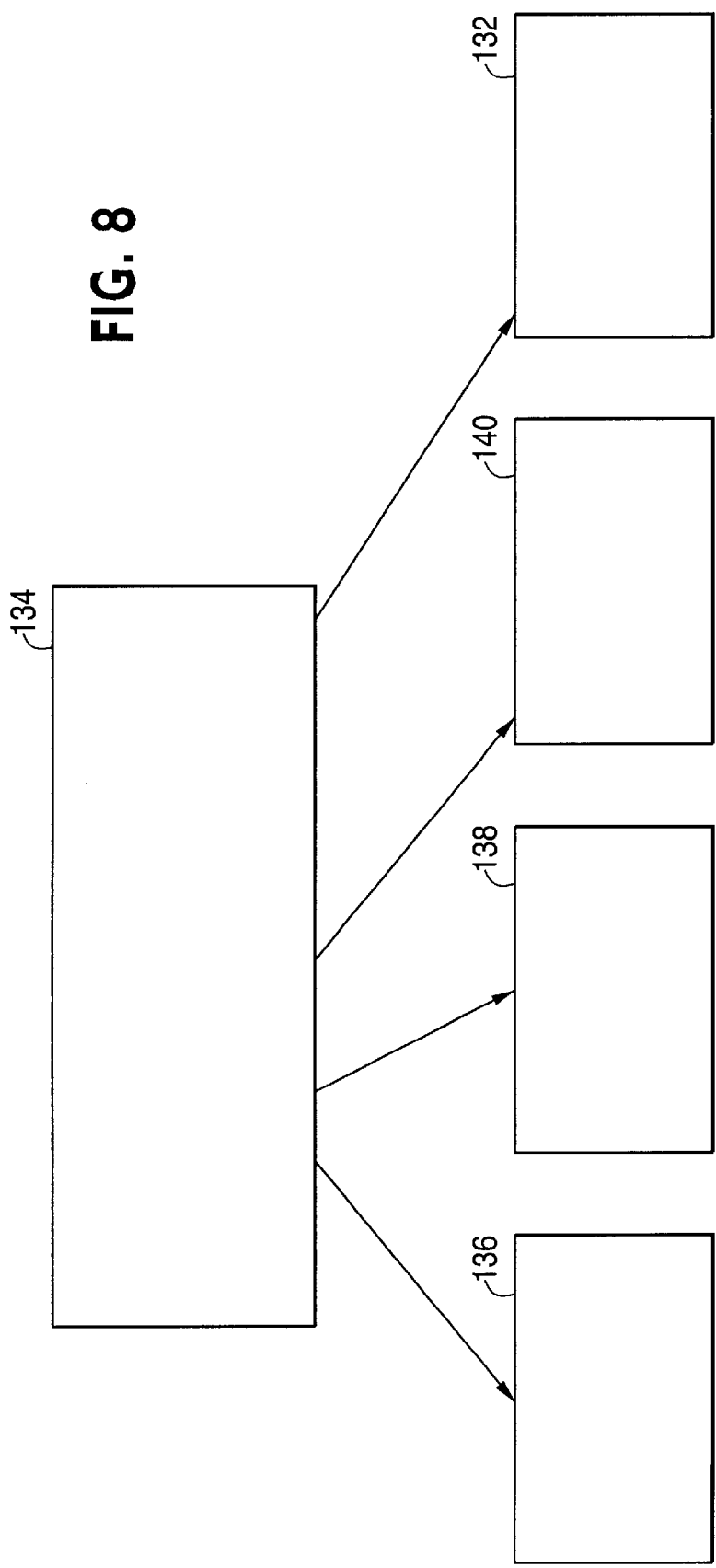
FIG. 8 shows an example of a service created by the ASF as a service inherited from the services object, in relation to other services also inherited from the services object.

FIG. 8 shows an example of a service 132 created by the ASF as a service inherited from the services object 134, in relation to other services 136, 138, 140 also inherited from the services object 134. More particularly, at startup 110 (FIG. 3) of the ASF, a service (for example, 132) is created which is inherited from a primary service object (such as 134). Within the created service 132, the ASF issues calls to objects that are part of the component being moved from the client computer 22 to the application server 24 to accomplish the service 132. The inherited service 132 then knows how to connect back to the application server 24.

In the ASF of the present invention, the entire component need not be inherited; only one object of the component needs to be inherited, and the inherited object of the component initiates the rest of the component.

By providing a framework under which services are ported from client computers 22 to application servers 24, the ASF of the present invention relieves the client computers 22 of the burden of having to run a process or execute a service at a specific time. The application servers 24, using the ASF of the present invention, then execute the requested service at the specified time, based upon the schedule of jobs 27 established to be executed by the ASF. Therefore, the client computers 22 can schedule processes to be executed at some future time, without requiring the client computer 22 requesting the service to remain active.

Figure 9:
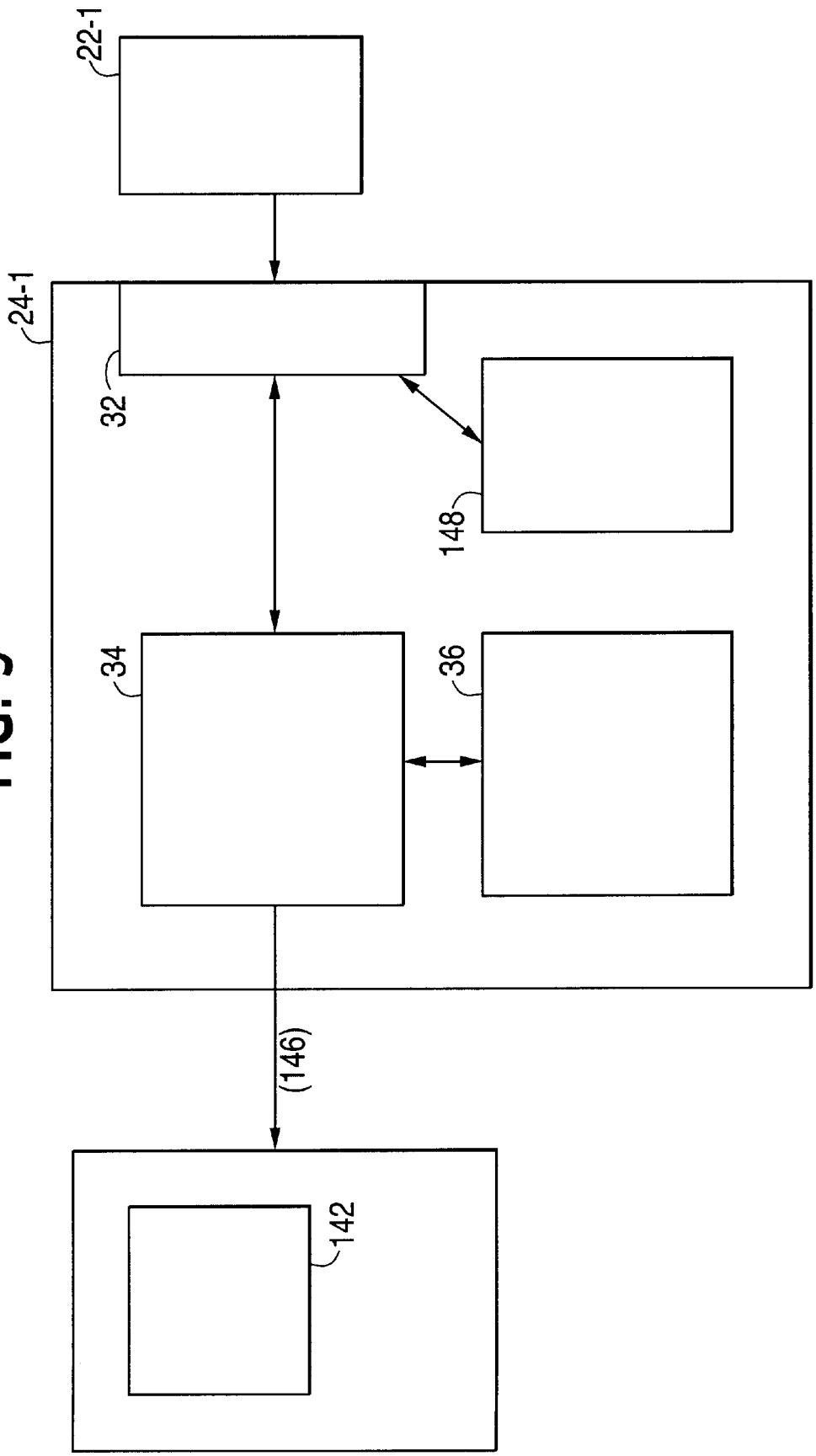
FIG. 9 is a diagram showing a relationship between an application server, including the listener, the schedule controller, and the connection controller of the ASF of the present invention, and a process created by the connection controller.

FIG. 9 is a diagram showing a relationship between an pplication server 24-1, including the listener 32, the schedule controller 6, and the connection controller 34 of the ASF of the present invention, and a process created by the connection controller 34. As shown in FIG. 9, the connection controller 34 creates (146) a process 12 to accomplish a requested service, such as EDA. The process 142 may be executed on another application server 24 (not shown in FIG. 9), on a client computer 22-1 requesting the service, or on a data base server 26 (not shown in FIG. 9). In addition to creating the process 142 to be executed, the connection controller 34 also creates a temporary shell 144 (which is maintained for future use) surrounding the created process 142. The connection controller 34 maintains the handle of (i.e., pointer to) the requested process 142.

Further, using the ASF of the present invention, each application server 24 (for example, of the application servers 24-1 through 24-M shown in FIG. 7) could be designated by the systems administrator for an installation or a site as specific to processes, which are installed only on the designated machines. For example, one of the application servers could be designated for providing EDA only services, while another of the application services could be designated as providing EDI and EDA services.

As discussed herein above, one of the application servers 24 is designated as the primary application server, and the listener 32 of the primary application server acts as a clearinghouse. In its role as a clearinghouse, the listener 32 of the primary application server determines which of the other applications servers or the primary application server should execute the service requested by a client computer 22, based upon which application server(s) is/are designated to execute the requested service, and the load each of the application server(s) designated to execute the requested service is carrying.

To determine which of the application servers is designated to execute the requested service, the listener 32 maintains and refers to a file storing that information to identify the candidate application servers. Once the listener 32 has determined the candidate application server(s) designated to execute the requested service, the listener 32 refers to the conventional load balancer 148, included as part of the ASF of the present invention, to determine which of the candidate application servers is most ideally suited—from an overall system load perspective—as a preferred application server to execute the requested service. Based on the load balancer 148, the listener 32 advises the connection controller 34 of the preferred application server 24. The connection controller 34 then establishes the needed connections therewith, as explained herein above.

When the ASF of the present invention is installed on an application server, the ASF functions without requiring alteration of client computer software.

With the ASF of the present invention, the application server console provides the ability to allow a user to start and stop the application server, and also displays the status of that particular application server. Through the ASF, users manage requests from client computers accessing the application server and manage the jobs the application server performs.

Figure 10:
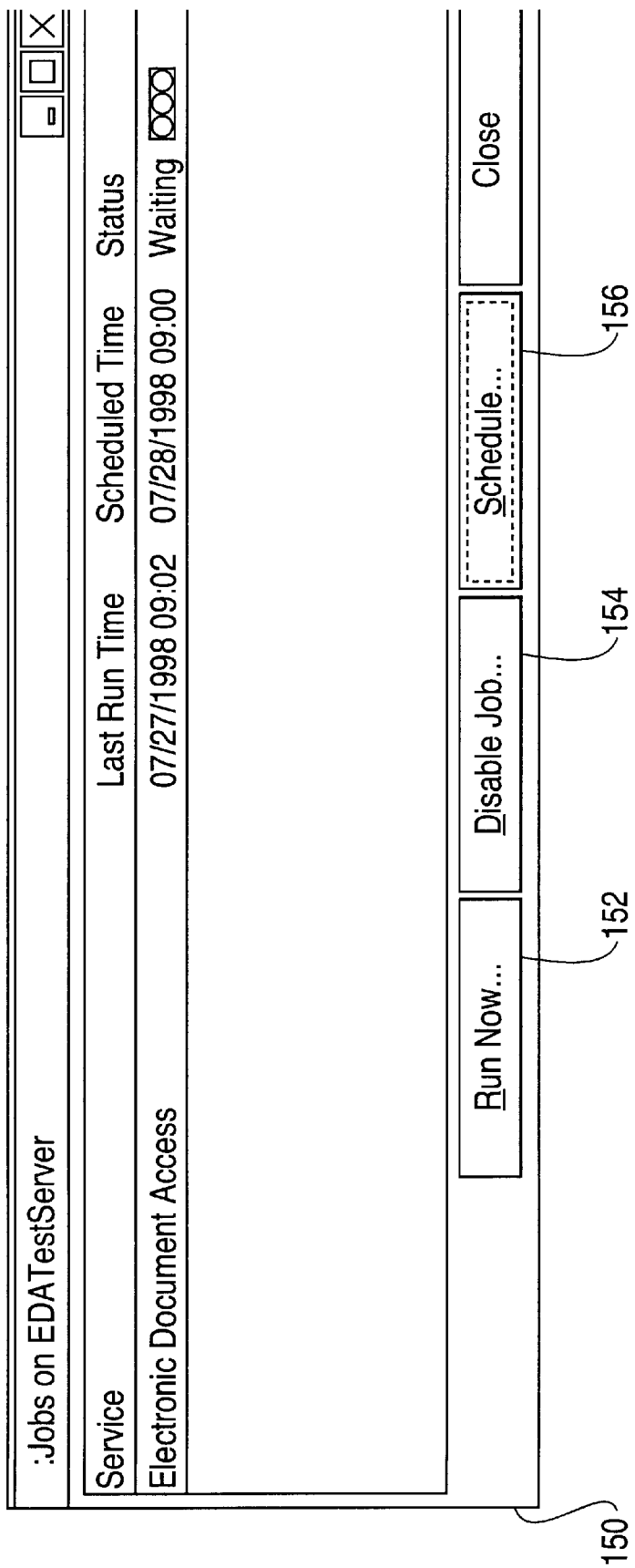
FIG. 10 shows an example of a job management screen of the ASF displayed to the users by the ASF of the present invention.

FIG. 10 shows an example of a job management screen 150 of the ASF displayed to the users by the ASF of the present invention. The job management screen 150 provides real-time status information on each scheduled service. The job management screen 150 displays on a console of the application server to authorized users a list of the batch services that are currently provided through the application server. As shown in FIG. 10, the job management screen 150 displays the last time the service was performed, the next scheduled time the service will be performed, and the current status of each service that is available. The job management screen 150 includes buttons such as Run Now . . . 152, Disable Job . . . 154, Schedule . . . 156. Through the Run Now . . . 152 button, the user can instruct the ASF to execute the selected service(s) on demand. Through the Disable Job . . . 154 button, the user can instruct the ASF to temporarily stop the selected service(s) from running. The ASF reads the schedule of jobs 27 to populate the job management screen 150.

FIG. 11 shows a jobs list screen 158 of the jobs scheduled to be executed by the application server. The jobs list screen provides the ability to schedule and manage routine services. The jobs list screen 158 is also populated from data read by the ASF from the schedule of jobs 27. Using the jobs list screen 158, authorized users are able to establish the schedule 27 that a service should be performed on through the ASF. The schedule 27 can be set to perform in daily, weekly, and monthly increments. Users may also enter a time when the service should start or a range of times over which it should execute. In the latter case, the range of time must be within the same day.

FIG. 12 shows a log viewer screen 160 of the ASF. The log viewer screen of the ASF provides a complete log of all operations performed by the application server.

The ASF of the present invention removes data intensive processing from the client computers and the database server, and also allows the client computers to schedule processing. Consequently, through the ASF, batch and on demand processing are available to the client computers. Further, any processing intensive work required by the procurement system can be accommodated by the ASF using plug in module functionality.

The flexibility of the ASF allows the SPS to meet the requirements of the Department of Defense, without degrading performance of the client computers or the database server.

The ASF's capabilities extend beyond the conventional application server in order to meet the DoD's future needs. The additional capabilities that extend beyond a conventional industry application server are unique. Further, the ASF approach in solving DoD Standard Procurement needs is a unique approach for a DoD wide procurement system and readily accommodates future DoD electronic procurement needs.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method comprising:
   independently requesting execution of services by a job scheduler integrated with an application server;
   establishing by a connection controller a connection to a service requested to be executed, said connection controller integrated with the application server and coupled to the job scheduler; and
   transmitting by a service broker the request for service, said service broker being provided in a client computer coupled to the application server, and said service broker coupled to the listener.

2. An apparatus comprising:
   an application server;
   a job scheduler integrated with the application server and independently requesting execution of services;
   a connection controller, integrated with the application server and coupled to the job scheduler, establishing connections with services based upon the requested execution of services;
   a listener, integrated with the application server and coupled to the connection controller, receiving requests for execution of services and transmitting the requested execution of services to the connection controller; and
   a service broker, coupled to the listener, transmitting the requests for execution of services to the listener.

3. An apparatus comprising:
   application servers working in concert with each other;
   a job scheduler controlling the application servers to work in concert with each other, wherein said job scheduler is integrated with one of the application servers and independently requests execution of services; and
   a listener, coupled to the connection controller, receiving requests for execution of services and transmitting the requested execution of services to the connection controller, wherein said job scheduler is integrated with one of the application servers and independently requests execution of services, said apparatus further comprising a service broker, coupled to the listener, transmitting the requests for execution of services to the listener.

4. A method comprising:
   starting up an application server framework installed on the computer system;
   determining by the application server framework whether a service is requested by an application server, based upon a job scheduler of the application server of the computer system, or by a client computer of the computer system;
   determining by the application server framework whether the requested service is executable by the application server, if the request for service is made by the client computer;
   establishing a connection to the service by the application server and executing the service, if the requested service is executable by the application server or if the service is requested by the application server;
   executing the requested service by the client computer if the client computer requested the service and if the service is not executable by the application server; and
   notifying the application server of the completion of the service if the application server requested the service, and notifying the client computer of the completion of the service if the client computer requested the service.

5. The method according to claim 4, wherein the application server framework transmits to the application server the handle of the service if the application server requested the service, and transmits to the client computer the handle of the service if the client computer requested the service.

6. A computer-readable device embodying a computer program, said computer program, when executed by a computer, directing the computer to perform the operation comprising:
   starting up an application server framework installed on the computer system;
   determining by the application server framework whether a service is requested by an application server, based upon a job scheduler of the application server of the computer system, or by a client computer of the computer system;
   determining by the application server framework whether the requested service is executable by the application server, if the request for service is made by the client computer;
   establishing a connection to the service by the application server and executing the service, if the requested service is executable by the application server or if the service is requested by the application server;
   executing the requested service by the client computer if the client computer requested the service and if the service is not executable by the application server; and
   notifying the application server of the completion of the service if the application server requested the service, and notifying the client computer of the completion of the service if the client computer requested the service.

7. The computer-readable device according to claim 6, wherein the computer program further directs the compter to transmit to the application server the handle of the service if the application server requested the service, and transmit to the client computer the handle of the service if the client computer requested the service.

* * * * *

UNITED STATES PATENT AND TRADEMARK OFFICE
CERTIFICATE OF CORRECTION

PATENT NO.   : 6,598,067 B1
DATED        : July 22, 2003
INVENTOR(S)  : Paul Wydra et al.

It is certified that error appears in the above-identified patent and that said Letters Patent is hereby corrected as shown below:

Column 15,
Line 4, change "compter" to -- computer --.

Signed and Sealed this

Twenty-third Day of December, 2003

JAMES E. ROGAN
*Director of the United States Patent and Trademark Office*